Nov. 18, 1952   D. GIACOSA   2,618,351
SUMP FOR INTERNAL-COMBUSTION ENGINES FOR MOTOR VEHICLES
Filed June 27, 1950   4 Sheets-Sheet 1

Inventor
Dante Giacosa
By Robert E. Burns
Attorney

Nov. 18, 1952 D. GIACOSA 2,618,351
SUMP FOR INTERNAL-COMBUSTION ENGINES FOR MOTOR VEHICLES
Filed June 27, 1950 4 Sheets-Sheet 2

Inventor
Dante Giacosa
By Robert E. Burns
Attorney

Nov. 18, 1952 D. GIACOSA 2,618,351
SUMP FOR INTERNAL-COMBUSTION ENGINES FOR MOTOR VEHICLES
Filed June 27, 1950 4 Sheets-Sheet 3

Inventor
Dante Giacosa
By Robert E Burns
Attorney

Nov. 18, 1952 D. GIACOSA 2,618,351
SUMP FOR INTERNAL-COMBUSTION ENGINES FOR MOTOR VEHICLES
Filed June 27, 1950 4 Sheets-Sheet 4
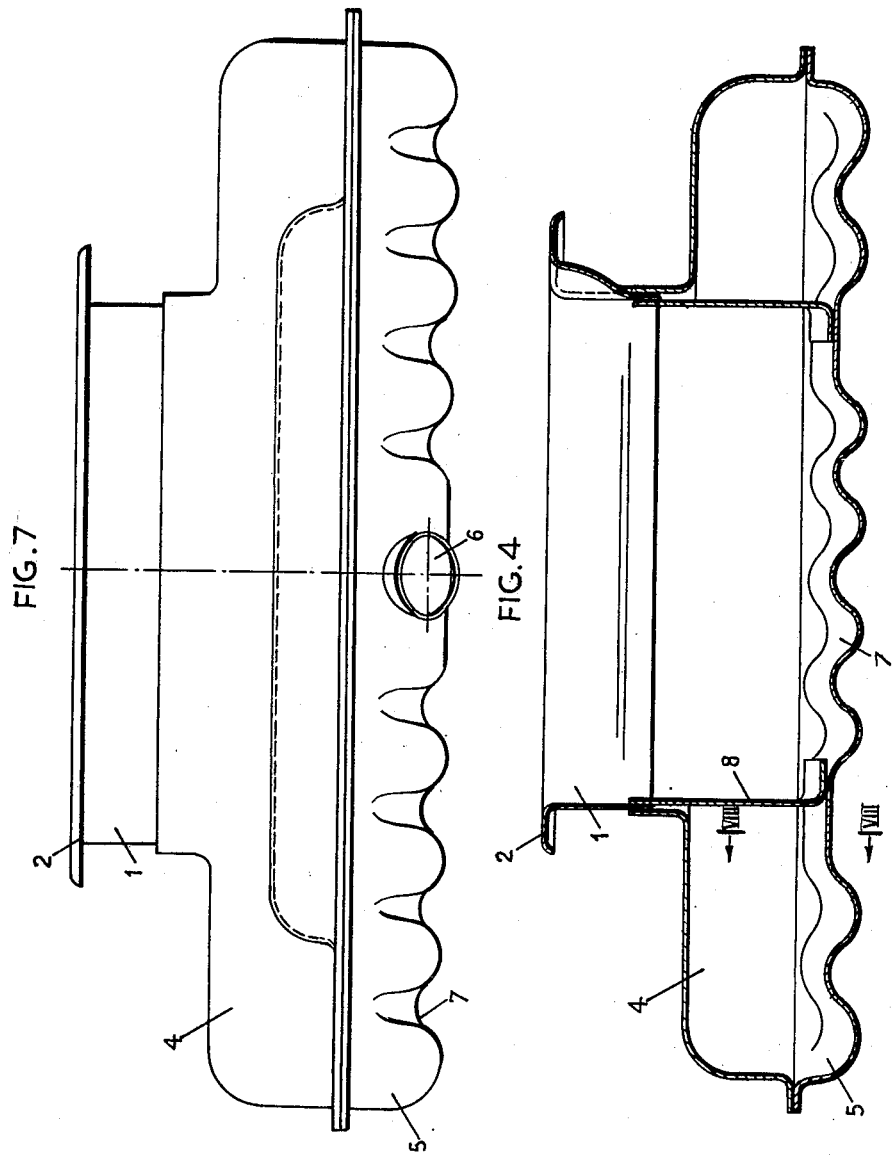
Inventor
Dante Giacosa
By Robert E. Burns
Attorney Patented Nov. 18, 1952

2,618,351

UNITED STATES PATENT OFFICE 2,618,351

SUMP FOR INTERNAL-COMBUSTION ENGINES FOR MOTOR VEHICLES

Dante Giacosa, Turin, Italy, assignor to Fiat S. p. A., Turin, Italy

Application June 27, 1950, Serial No. 170,618
In Italy June 30, 1949

3 Claims. (Cl. 180—69.1)

This invention relates to an internal combustion engine for motor vehicles, that may be mounted in the fore portion of the frame over the axle without interfering with the assembly of the axle and steering gear.

An object of this invention is to provide in an internal combustion engine of the type referred to a sump comprising an upper dished portion having an intermediate opening and an outer profile substantially equalling the profile of the crankcase of the engine and an underlying portion applied to said opening and extending forwardly and laterally beyond the external profile of said upper portion in order to leave at the rear under said upper portion a clearance for fitting the front axle of the vehicle and in front between the fore ends of said portions a clearance that may be utilized for assembling the steering gear of the motor vehicle. This arrangement is more particularly advantageous, because it affords during drive a wide cooling surface for the oil collecting in the sump.

A further object of this invention is to provide a sump for an internal combustion engine, as specified above, in which the lower portion extending laterally and forwardly beyond the profile of the upper portion is closed below by a dished cover which is corrugated for enlarging the heat dispersion surface.

A further object of this invention is to provide in a sump of the type specified above a flux-breaking diaphragm of C-shape secured to the edge of the intermediate opening in the upper portion and to cover closing the lower opening in the sump lower portion. This diaphragm serves for retaining oil in the central sump portion, even when the vehicle is strongly inclined.

A further object of this invention is to provide a sump of the form specified, in which all the parts forming the sump are obtained from pressed sheet metal and welded together. This makes manufacture of the sump easy and inexpensive, notwithstanding its elaborate shape.

The accompanying drawing shows diagrammatically by way of example an embodiment of the cup for internal combustion engines for motor vehicles according to this invention.

Figures 4, 5, 6 are sections on lines IV—IV, V—V and VI—VI, respectively, of Figure 2;

Figure 7 is a view in the direction of the arrow 7 of Fig. 2.

Figure 1:
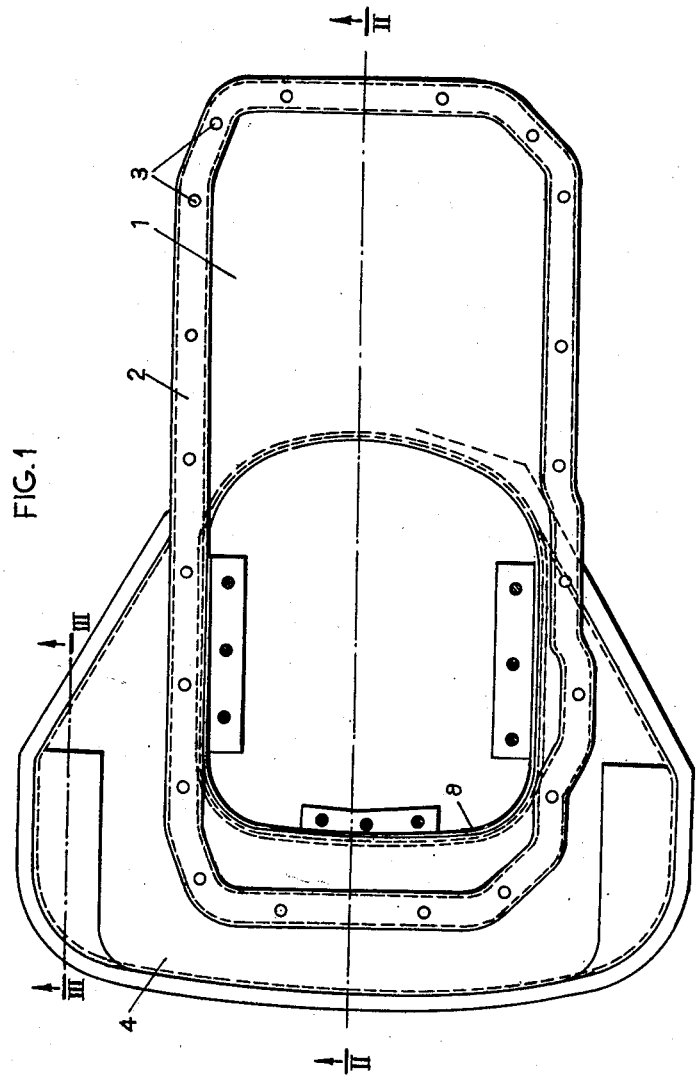
Figure 1 is a plan view of the sump.

The sump comprises an upper sheet metal member 1, provided with an upper edge having holes 3 bored therein for attachment to the lower surface of the crank case. The lower end of the member 1 has welded thereto an intermediate member 4 to which is welded in turn the lower member 5 having a hole 6 bored therein for the outlet of oil and lower corrugations 7 forming the cooling ribs. The extensive surface of the member 5 together with the ribs 7 affords an efficient cooling of the oil.

Figure 2:
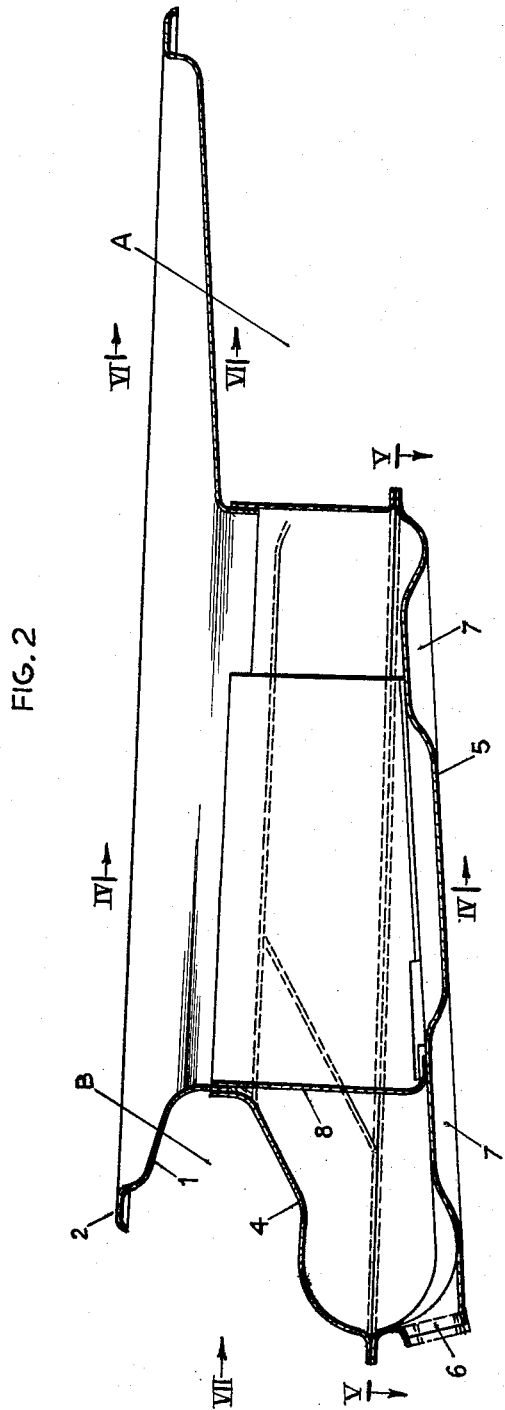
Figures 2 and 3 are sections on lines II—II, III—III of Figure 1, respectively.
Figure 6:
Figure 3:
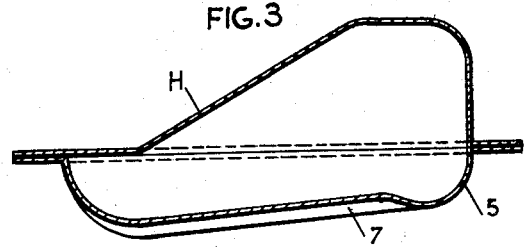
Figure 8:
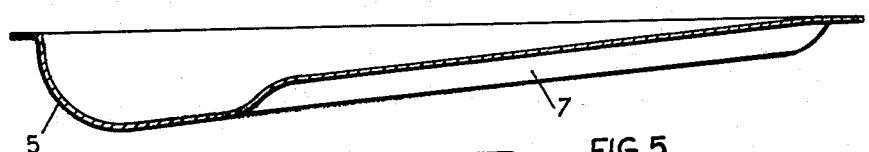
Figure 8 is a section on line VIII—VIII of Figure 4.
Figure 5:
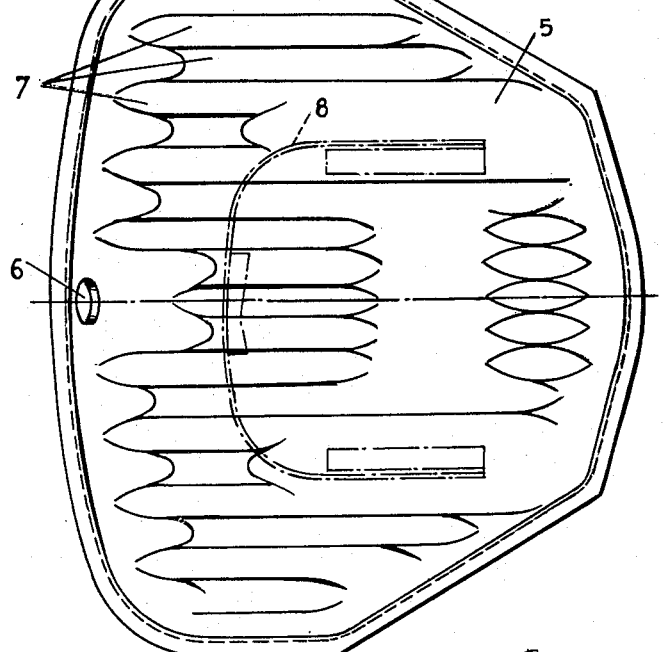

As will be clearly seen in Figure 2 the sump construction is such as to leave at the rear a clearance A for arrangement of the axle of the front wheels and at the front a clearance B for the steering linkage.

A partition member 8 is secured to the central sump portion and retains the oil in said portion even in the case of strong inclinations, avoiding the danger of failure of the pump.

What I claim is:

1. In a motor vehicle an internal combustion engine having a sump comprising a dished upper portion having a marginal flange for attachment to the crankcase of said engine and an opening extending from a point near its front end to an intermediate point, a lower portion having an opening at its upper end fitted to said opening in the dished upper portion and extending laterally and forwardly beyond the outer profile of said upper portion said lower portion having an opening at its lower end and a dished cover closing the lower end of said lower portion, so that two clearances are left free underneath said upper portion and may be utilized for assembling component parts of said motor vehicle.

2. In a motor vehicle an internal combustion engine having a sump comprising a dished upper portion adapted to be fitted to the crankcase of said engine and an opening extending from a point near its front end to an intermediate point, a lower portion having an opening at its upper end applied to said opening in the dished upper portion and extending laterally and forwardly beyond the outer profile of said upper portion, to form an extensive heat dispersion surface through the draught generated during drive, said lower portion having an opening at its lower end and a dished cover closing below said lower portion, said cover being formed with corrugations for enlarging the heat dispersing surface.

3. In a motor vehicle with an internal combustion engine having a sump as claimed in claim 2, a C-shaped partition secured to the edge of the intermediate opening in the upper portion and to the lower cover, said partition serving to retain the oil in the central sump portion even when the vehicle is strongly inclined.

DANTE GIACOSA.

REFERENCES CITED

The following references are of record in the file of this patent:

UNITED STATES PATENTS

| Number | Name | Date |
|---|---|---|
| 2,039,002 | Hutchinson | Apr. 28, 1936 |